Sept. 24, 1968   P. J. BRUHA   3,402,606

FLUID VELOCITY MEASURING SYSTEM

Filed Aug. 3, 1966

WITNESSES:
Bernard R. Giguere
James F. Young

INVENTOR
Peter J. Bruha
BY Jean Schron
ATTORNEY

United States Patent Office 3,402,606
Patented Sept. 24, 1968

3,402,606
FLUID VELOCITY MEASURING SYSTEM
Peter Joseph Bruha, Severna Park, Md., assignor to Westinghouse Electric Corporation, Pittsburgh, Pa., a corporation of Pennsylvania
Filed Aug. 3, 1966, Ser. No. 569,996
6 Claims. (Cl. 73—194)

ABSTRACT OF THE DISCLOSURE

Opposed transducer stations in a fluid medium simultaneously project an acoustic signal towards one another and thereafter produce respective first and second received signals, the time occurrence of which is dependent upon the velocity of the fluid medium. A primary digital counter counts up the output of a variable frequency oscillator for a time period commencing with the first received signal and ending with the second received signal. The complement of the count in the primary digital counter is transferred to a complement register which thereafter counts up the output of a stable crystal oscillator until the complement register is full, at which time the crystal oscillator is turned off. The time period beginning with the turning on of the crystal oscillator and ending with the turning off of the crystal oscillator is used to gate the output of the variable frequency oscillator to a secondary digital counter. After the time interval the secondary digital counter has a count which is indicative of fluid velocity and which count is totally dependent of the speed of sound in the fluid under test.

---

Figure 1:
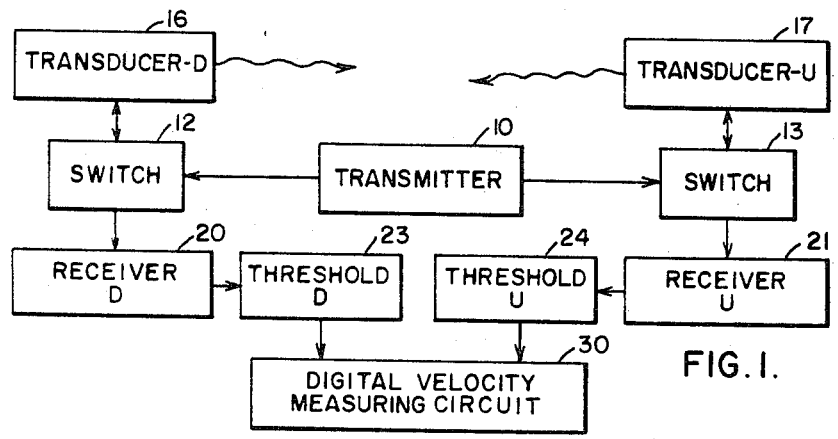

This invention in general relates to digital fluid velocity measuring systems, and particularly to a measuring system which accurately compensates for variations in the speed of sound in the fluid under measurement.

A wide variety of flow meter systems include an upstream transducer station and a downstream transducer station communicative with the fluid under measurement, and wherein acoustic energy is simultaneously transmitted, during periodic transmission cycles, to both transducer stations. In the absence of fluid flow, the time it takes for the acoustic energy to travel from the transmitter to the downstream transducer or from the transmitter to the upstream transducer station is $T = L/C$ where T is the time, L is the distance from transmitter to the transducer station and C is the speed of sound in the fluid. For convenience the upstream and downstream transducer stations act as transmitters and simultaneously project acoustic energy towards one another so that in both cases the L term is the same. If a velocity is imparted to the fluid, the acoustic energy traveling downstream will be aided by the velocity and the acoustic energy traveling upstream will be retarded by the velocity and the above equation is modified so that $$T_D = \frac{L}{C+V}$$

and $$T_U = \frac{L}{C-V}$$

where $T_D$ is the downstream time, $T_U$ is the upstream time and V is the velocity of the fluid. The difference in acoustic travel time downstream and upstream $T_D - T_U$ is equal to $$\frac{2LV}{C^2 - V^2}$$

and since $C^2$ is much larger than $V^2$, the equation becomes $$T_D - T_U = \frac{2LV}{C^2}$$

for most practical purposes. With a known L and a known C therefore it is seen that the velocity of the fluid is proportional to the difference in transit times of the upstream and downstream acoustic energy. The transit times may be indicated by the transducer stations respectively providing first and second received pulses in response to impinging acoustic energy. The problem arises however, that in actuality the speed of sound is not constant but varies with the mineral content and temperature of the fluid being measured; therefore in such flowmeter systems means must be provided to compensate for the varying speed of sound if a high degree of accuracy is to be maintained.

One type of compensating scheme utilizes a variable frequency oscillator (VFO), and a primary digital counter which counts up the VFO output for a time period $\Delta T$ corresponding to the difference in time occurrence of the first and second received pulses. The count in the primary digital counter therefore is an indication of fluid velocity since the difference in time occurrence of the first and second received pulses is an indication of the fluid velocity. A correction circuit is generally provided to vary the output frequency of the VFO in accordance with variations in the speed of sound in the fluid. The count $n$ in the primary digital counter equals the frequency of the VFO times the difference in time occurrence of the first and second received pulses, that is $n = F_{VFO} \times \Delta T$. Since $F_{VFO} = (KC)$, where K is a constant of proportionality and C is the speed of sound in the fluid, $n = (KC) \times (2LV/C^2)$ which reduces to $n = (2KL/C)V$ and it is seen that $n$ has an error inversely proportional to C. The VFO correction therefore has the effect of reducing the error from inversely proportional to $C^2$ to inversely proportional to C. Further compensating means are provided to eliminate the inversely proportional to C error and these means generally take the form of a digital to analog converter system which is responsive to the count in the primary digital counter and averages out, over a period of time, any remaining variations in the C term by suitable analog manipulations.

It is a primary object of the present invention to provide a system of the class described which corrects for the speed of sound without the necessity of digital-to-analog conversion equipment.

Another object is to provide a system of the class described which accurately and totally compensates for any variation in the speed of sound in the fluid under measurement.

A further object is to provide a system of the class described wherein final velocity readings may have a built-in scale factor which may be varied according to the particular final velocity output reading desired.

Briefly, in accordance with the above objects, the present system for final compensation of variations in speed of sound include a secondary digital counter and a stable oscillator for providing a constant frequency output signal. Circuit means are provided for generating a time interval equal to a count in the primary digital counter, times the reciprocal of the frequency of the stable oscillator. It has been previously stated that a variable frequency oscillator supplies its output signal to a primary digital counter. In the present invention, the secondary digital counter additionally receives the VFO output, and receives it for the aforementioned time interval. In this manner, the secondary digital counter, after the generated time interval, has a count which is indicative of fluid velocity and which is totally independent of the speed of sound. A signal proportional to the accurate fluid velocity therefore is obtained from the secondary digital counter. By providing different stable oscillator frequencies, the count in the secondary digital counter may be scaled up or down to give an output signal that is either a direct reading of the velocity or any other variable directly proportional to velocity such as discharge (area times velocity), and to any desired scale factor.

Figure 2:
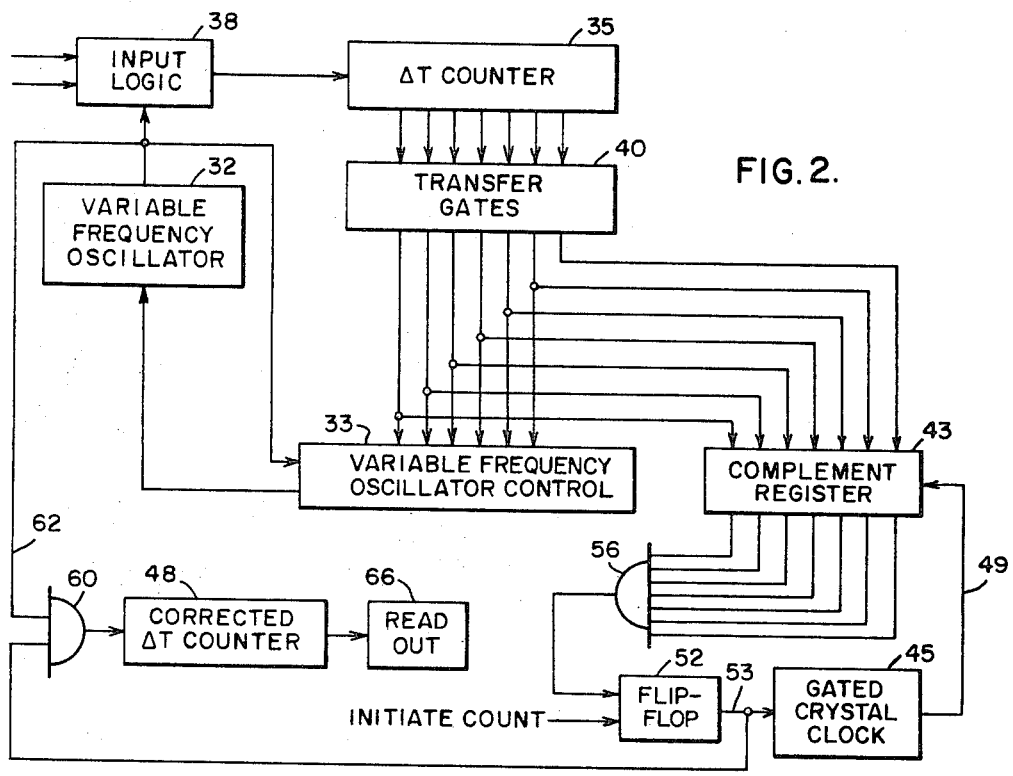

The above stated, as well as further objects and advantages of the present invention will become apparent upon a reading of the following detailed specification taken in conjunction with the drawings, in which:

FIGURE 1 illustrates, in block diagram form, a typical fluid velocity measuring system in which the present invention may be used; and FIG. 2 is a block diagram illustrating the operation of the present invention in conjunction with a fluid velocity measuring system.

Referring now to the typical fluid velocity measuring system in FIG. 1, there is illustrated a transmitter 10 which supplies a pulse of electrical energy during periodic transmission cycles, through switches 12 and 13 to downstream and upstream transducer stations 16 and 17 respectively. For convenience and to enhance accuracy, each transducer station may comprise only one transducer which is operable to send an acoustic signal to its opposing transducer and will provide a corresponding output signal when acoustic energy impinges upon the transducer. The acoustic energy received by the downstream transducer 16 produces a signal which is conducted through switch 12 to receiver 20 and the signal provided by transducer 17 as a result of the acoustic energy produced by transducer 16 is conducted through switch 13 to receiver 21. Threshold devices 23 and 24 are responsive to the output of the receivers 20 and 21 for providing pulses, herein termed received pulses, indicative of the respective travel time of the acoustic energy provided by transducers 16 and 17.

With a fluid velocity (in an upstream to downstream direction), the acoustic energy will arrive at the transducer 16 first, since it is aided by the fluid velocity and the acoustic energy will arrive at transducer 17 at a later point in time since it is retarded by the fluid velocity. Threshold device 23 will provide a received pulse first and threshold device 24 will provide a received pulse thereafter with the difference in time occurrence between the first and second pulses being indicative of the water velocity in accordance with the previously stated equation $$T_D - T_U = \frac{2LV}{C^2}$$

The digital velocity measuring circuits generally designated by the numeral 30 are provided and are responsive to the first and second received pulses in order to provide an indication of fluid velocity. FIG. 2 illustrates some of the components which may be used in the velocity measuring circuits block 30 of FIG. 1.

In FIG. 2 as is done in prior art arrangements, there is provided a variable frequency oscillator 32 the output frequency of which is governed by a VFO control means 33. The output signal from the VFO 32, which signal may be in the form of a square wave, pulses, or any other periodic wave which may be counted by digital counter means, is fed to a primary digital counter in the form of $\Delta T$ counter 35 for a period of time governed by the first and second received signals. The gating of the VFO output to the $\Delta T$ counter 35 is controlled by the input logic means 38 which may include the threshold detectors 23 and 24 (FIG. 1) and other gates in a manner to perform the function of supplying the $\Delta T$ counter 35 with the VFO output signal for a period of time beginning with the first received pulse and ending with the second received pulse.

Transfer means in the form of transfer gates 40 are provided in order to transfer an indication of the count in the $\Delta T$ counter 35 to the VFO control means 33, which, in conjunction with the VFO output 32, functions to vary the frequency of the VFO 32 to reduce any error in the count of the $\Delta T$ counter 35 due to variations in the speed of sound. The correction system thus far described in FIG. 2 is the subject matter of copending application Ser. No. 590,618, filed Oct. 31, 1966, and assigned to the assignee of the present invention.

In the present invention means are provided for storing an indication of the count in the $\Delta T$ counter 35 for use in correcting for variations in the speed of sound in the fluid under measurement. To this end, a complement register 43 is provided and when the transfer gates 40 are enabled, the complement signal, that is, the complement of the number in the $\Delta T$ counter 35 is transferred to the complement register 43. The $\Delta T$ counter 35 and the complement register 43 may be standard counters comprising a chain of counting flip-flops with suitable connections provided to sense the state of operation of the individual flip-flops. Additionally, if desired, means may be associated with the $\Delta T$ counter 35 whereby an average count, after a number of transmission cycles, may be provided. The property of the complement signal and complement register 43 is such that if the count in the $\Delta T$ counter 35 was $n$, it will take exactly $n$ counts to fill the complement register 43. An extremely stable oscillator means in the form of gated crystal clock 45 is operable when enabled, to supply a stable constant frequency output to the complement register. By counting $n$ counts from the gated crystal clock 45 into the complement register 43 a time interval is generated according to the following equation $T = n \times 1/F$, where $F$ is the frequency of the crystal oscillator. The time interval $T$ is utilized to gate the variable frequency oscillator output into a secondary digital counter in the form of corrected $\Delta T$ counter 48.

At the end of time interval T the corrected $\Delta T$ counter 48 will have a count $n'$, where $n' = F_{VFO} \times T$. Since $F_{VFO}$ is proportional to the speed of sound in the fluid and $$T = n \times 1/F \text{ and } n = (2KL)_V/C,$$
$$n' = (KC) \times (2KL)_V/C \times 1/F$$

which reduces to $n' = (2K^2L)_V/F$ and it is seen therefore that the count in the correct $\Delta T$ counter 48 is totally independent of C the speed of sound in the fluid under measurement.

One embodiment of the invention whereby the time interval T is generated, or defined, includes means for enabling the gate of crystal clock 45 to supply pulses to be counted, via lead 49 to the complement register 43. This may be accomplished by the provision of flip-flop 52 which, upon receipt of an Initiate Count signal from a program control source (not shown) will provide an enabling output signal on output lead 53 to the gated crystal clock 45. When the complement register 43 is full, that is, has attained the count $n$, it signals the flip-flop 52 to shut off the gated crystal clock 45. This is accomplished by the provision of AND gate 56 which may be connected to each flip-flop of the complement register 43 to provide a one output signal when all the flip-flops are in the ONE state. The provision of the output signal by AND gate 56 serves to switch flip-flop 52 to its opposite state thereby shutting off the gated crystal clock 45.

The time period that the flip-flop 52 provided the enabling output signal on lead 53 is the aforementioned time interval T which begins when the complement register 43 starts counting and ends when the complement register has counted $n$ counts of the gated crystal clock output. The output signal from flip-flop 52 is additionally utilized to enable AND gate 60 which gates the VFO 32 output signal via lead 62 to the corrected $\Delta T$ counter 48 for the period of time that the flip-flop 52 provides its enabling output signal, that is, for a time interval T.

Although not limited thereto, it is preferable that the transfer from the $\Delta T$ counter 35, the provision of the Initiate Count Signal, and the generation of the time interval T takes place at a time subsequent to the second received signal, and prior to the next transmission.

It is seen that both the $\Delta T$ counter 35 and the corrected $\Delta T$ counter 48 receive the output signal from the VFO 32. However, the count $n$ in the $\Delta T$ counter 35 is not independent of the speed of sound C whereas the count $n'$ in the corrected $\Delta T$ counter 48 is totally independent of the speed of sound. The count $n'$ is indicative of the fluid velocity and in order to provide an indication of the velocity, readout means 66 are provided. A readout may be up-dated with each transmission cycle or may be up-dated over longer periods of time. The readout may be in digital form for present or future use in conjunction with computer operations and/or may be analog in form for meaningful interpretations.

Since the time interval T depends upon the frequency of the stable oscillator, and since the number $n'$ in the corrected $\Delta T$ counter 48 depends upon the time interval T, it follows therefrom that the number $n'$ is also dependent upon the frequency of the stable oscillator. The number $n'$, that is, the number of counts in the corrected $\Delta T$ counter 48, is proportional to the fluid velocity V. If it is desired that each count in the corrected $\Delta T$ counter 48 represent for example 1/10 ft. per second or 1 ft. per second, etc., the stable oscillator frequency may be chosen accordingly, that is, the frequency may be chosen so that $n'$ is any convenient number of counts per ft. per second thereby providing any desired scale factor.

Although the present invention has been described with a certain degree of particularity, it should be understood that the present disclosure has been made by way of example and that modifications and variations of the present invention are made possible in the light of the above teachings. Additionally, readings proportional to the velocity may be provided by manipulation of the operating frequencies so as to obtain, by way of example, discharge readings.

What is claimed is:

1. In a fluid velocity measuring system, including first and second opposed transducer stations, and which operates in transmission cycles wherein during each transmission cycle acoustic energy is propagated toward the opposed transducer stations which upon receipt of the acoustic energy provide respective first and second received pulses, and wherein a primary digital counter is supplied with pulses from a variable frequency oscillator for a time interval $\Delta T$ determined by the first and second received pulses, and periodic correction of the variable frequency oscillator frequency is made in accordance with variations of speed of sound in the fluid, the improvement comprising in combination:
   (a) a secondary digital counter;
   (b) a stable oscillator for providing a constant frequency output signal;
   (c) first circuit means for generating a time interval T equal to a count in the primary digital counter times the reciprocal of the frequency of said stable oscillator; and
   (d) second circuit means for supplying said secondary digital counter with the variable frequency output signal for said time interval, whereby the count in said secondary digital counter after said time interval is indicative of fluid velocity.

2. Apparatus according to claim 1 wherein the first circuit means includes:
   means for storing an indication of the count in the primary digital counter during an $n$th transmission cycle for use in determining the time interval T prior to a subsequent transmission.

3. Apparatus according to claim 1 wherein the first circuit means includes:
   (a) register means operable to count input pulses;
   (b) means for transferring the complement of the count in the primary digital counter to said register means;
   (c) means responsive to a predetermined input signal for supplying said register means with the constant frequency output signal until a count is reached, said count being equal to the count in the primary digital counter just prior to said transfer, whereupon an output signal is provided;
   (d) the time interval T being substantially equal to the duration of time commencing with the application of the constant frequency to said register means and terminating with the provision of said output signal.

4. Apparatus according to claim 3 which includes:
   (a) means for providing an enabling signal for a period of time from the predetermined input signal to the provision of the output signal and further includes;
   (b) a gating means responsive to the output signal of the variable frequency oscillator and to said enabling signal for gating the variable frequency oscillator output to the secondary digital counter when enabled by said enabling signal.

5. Apparatus according to claim 4 wherein:
   (a) the register means comprises a chain of flip-flops and wherein;
   (b) gating means are provided for sensing the states of operation of the flip-flops of the register means for providing the output signal when the flip-flops are all in a first state of operation; and which further includes,
   (c) flip-flop means operable to provide first and second value output signals;
   (d) said flip-flop means being responsive to the predetermined input signal for providing its first valued output signal and being responsive thereafter to the output signal provided by the gating means for providing its second valued output signal, the time interval that said flip-flop means provides its first valued output signal being equivalent to the time interval T.

6. Apparatus according to claim 5 wherein the stable oscillator is gated on by the provision of the first valued output signal from the flip-flop means and is gated off by the provision of the second valued output signal from the flip-flop means.

References Cited

UNITED STATES PATENTS 3,336,801  8/1967  Snavely _____ 73—194 XR

RICHARD C. QUEISSER, *Primary Examiner.*

C. A. RUEHL, *Assistant Examiner.*